United States Patent
Chen et al.

(10) Patent No.: US 12,279,225 B2
(45) Date of Patent: Apr. 15, 2025

(54) METHOD AND SYSTEM FOR FINGERPRINT POSITIONING BASED ON 5G MULTI-BEAM DOWNLINK SIGNALS

(71) Applicant: Wuhan University, Wuhan (CN)

(72) Inventors: Liang Chen, Wuhan (CN); Xin Zhou, Wuhan (CN); Ruizhi Chen, Wuhan (CN)

(73) Assignee: Wuhan University, Wuhan (CN)

( * ) Notice: Subject to any disclaimer, the term of this patent is extended or adjusted under 35 U.S.C. 154(b) by 0 days.

(21) Appl. No.: 18/377,828

(22) Filed: Oct. 9, 2023

(65) Prior Publication Data

US 2024/0137896 A1   Apr. 25, 2024

(30) Foreign Application Priority Data

Oct. 17, 2022   (CN) .......................... 202211264879.1

(51) Int. Cl.
   *H04W 64/00*   (2009.01)
   *G01S 5/02*    (2010.01)

(52) U.S. Cl.
   CPC ......... *H04W 64/00* (2013.01); *G01S 5/02521* (2020.05)

(58) Field of Classification Search
   None
   See application file for complete search history.

(56) References Cited

U.S. PATENT DOCUMENTS

2022/0247474 A1*   8/2022   Rune ..................... H04W 24/10

FOREIGN PATENT DOCUMENTS

| CN | 102480678 A | 5/2012 |
| CN | 209843932 U | 12/2019 |
| CN | 110770751 A | 2/2020 |
| CN | 113055981 A | 6/2021 |
| WO | WO2019240771 A1 | 12/2019 |
| WO | WO2022186943 A1 | 9/2022 |

* cited by examiner

*Primary Examiner* — Suhail Khan
(74) *Attorney, Agent, or Firm* — George D. Morgan

(57) ABSTRACT

A method and system for fingerprint positioning based on 5G multi-beam downlink signals, includes: extracting multi-beam SSB from 5G downlink signals, and obtaining multi-beam SSS signal and DM-RS signal from multi-beam SSB; calculating multi-beam reference signal received power RSRP based on multi-beam SSS signal and DM-RS signal; calculating the RSSI of 5G downlink synchronization channel based on multi-beam SSB autocorrelation, and calculating the multi-beam reference signal received quality RSRQ based on multi-beam RSRP and RSSI; stacking the multi-beam RSRP and RSRQ to form multi-beam fingerprint features; inputting multi-beam fingerprint characteristic into neural networks, and the neural networks output positioning results.

9 Claims, 3 Drawing Sheets

METHOD AND SYSTEM FOR FINGERPRINT POSITIONING BASED ON 5G MULTI-BEAM DOWNLINK SIGNALS

CROSS-REFERENCE TO RELATED APPLICATIONS

The application claims priority to Chinese patent application No. 2022112648791, filed on Oct. 17, 2022, the entire contents of which are incorporated herein by reference.

TECHNICAL FIELD

The present invention belongs to wireless positioning field, and especially relates to a method and system for fingerprint positioning based on 5G multi-beam downlink signals.

BACKGROUND

Indoor positioning is one of the core technologies of indoor position service, Internet of Everything and artificial intelligence. It plays a huge role in public security services such as emergency medical care, intelligent warehousing, mobile health and human society, etc. The indoor environment has a complex topology, and the environment is easy to change. Efficient and high precision navigation and positioning in complex indoor environments are currently difficulties of location services. GNSS system is able to position in outdoor open areas, but can't penetrate indoors to form effective positioning. The current indoor positioning technologies, such as WIFI, Bluetooth, and Ultra-Wide Band, etc. Although each has its own advantages, these signal sources cannot achieve large scale coverage like GNSS to cause limited application, which is difficult to meet the needs of mobile smart terminal positioning.

With the rapid development of 5G technology and the large-scale setting of 5G base stations in outdoor and indoor spaces. 5G, as the mainstream communication technology in the future, will become an important signal source of indoor and outdoor spaces. Due to the introduction of key technologies such as large-scale antenna arrays, ultra dense networks, and new multiple access technologies in 5G, which achieve advantages such as high-speed, large bandwidth, and low latency communication appear, and may bring new opportunities in indoor positioning.

Positioning based on 5G multi-beam downlink signals is the key to achieving consumer level 5G indoor and outdoor positioning research. The larger bandwidth of downlink signals and positioning based on the terminal will have flexible and extensive application scenarios, such as industrial manufacturing, intelligent transportation, logistics warehousing, retail, health and medical care, etc. At present, in actual indoor commercial deployments, single base station scenarios are common, which makes it difficult to form geometric positioning.

SUMMARY

The present invention provides a method and system for fingerprint positioning based on 5G multi-beam downlink signals, which uses the characteristic of commercial 5G multi-beam signals to achieve the construction of multi-characteristic and multi-beam fingerprint. The method and system can realize high precision positioning based on commercial 5G NR downlink signals.

In the first aspect, it provides a fingerprint positioning method based on 5G multi-beam downlink signals, including: extracting multi-beam synchronization signal block (SSB) from 5G downlink signals, and obtaining multi-beam secondary synchronization signal (SSS) signal and demodulation reference signal (DM-RS) signal from multi-beam SSB; calculating multi-beam reference signal received power (RSRP) based on multi-beam SSS signal and DM-RS signal; calculating the received signal strength indicator RSSI of 5G downlink synchronization channel based on multi-beam SSB autocorrelation, calculating the reference signal received quality (RSRQ) based on multi-beam reference signal received power RSRP and RSSI; stacking the multi-beam RSRP and RSRQ to form multi-beam fingerprint features; inputting multi-beam fingerprint characteristic into neural networks, and the neural networks output positioning results.

In the second aspect, it provides a fingerprint positioning system based on 5G multi-beam downlink signals, includes: SSB extraction module, which is configured to extract multi-beam SSB from 5G downlink signals, and to obtain multi-beam SSS signal and DM-RS signal based on multi-beam SSB; reference signal received power RSRP calculation module, which is configured to calculate multi-beam RSRP based on multi-beam SSS signal and DM-RS signal; reference signal received quality RSRQ calculation module, which is configured to calculate the RSSI of 5G downlink synchronization channel based on multi-beam SSB autocorrelation, and to calculate the RSRQ based on multi-beam RSRP and RSSI; multi-beam fingerprint characteristics construction module, which is configured to stack the multi-beam RSRP and RSRQ to form multi-beam fingerprint features; and positioning module, which is configured to input multi-beam fingerprint characteristic into neural networks, and the neural networks output positioning results.

In the third aspect, it provides an electronic device, including: processor; storage, which includes one or more program modules; wherein one or more program modules are stored in the memory and configured by the processor. One or more program modules include instructions to implement the fingerprint positioning method based on the 5G multi-beam downlink signals.

In the fourth aspect, it provides a storage medium, which is used for storing non-temporary instructions. When the non-temporary instructions are executed by the processor, the fingerprint positioning method based on 5G multi-beam downlink signals may be implemented.

BRIEF DESCRIPTION OF DRAWINGS

In order to explain the technical solution of the embodiment of the present invention more clearly, the drawings of the embodiment will be briefly given below.

DETAILED DESCRIPTION OF THE EMBODIMENTS

The current indoor positioning technology is based on WIFI, Bluetooth, and Ultra-Wide Band, which needs to deploy additional base stations according to specific scenarios. It is difficult to form large scale applications and achieve wide coverage positioning. The needs of consumers are difficult to meet even by deploying additional positioning base station and the positioning base station is difficult to popularize. The present invention is based on large scale deployment of commercial 5G signal, which can be deployed on the basis of 5G communication without the need of additional positioning base stations. Based on the existing facilities, it can meet the needs of positioning services and largely reduce application costs.

In addition, there are few researches on 5G NR, which are mainly concentrated on the base station side positioning based on uplink signals. However, only device side enterprises can obtain complete information of base station positioning, which is difficult to achieve open research and widespread application. Moreover, the current allocation of 5G NR uplink and downlink time slots is mainly dominated by the downlink. Therefore, the bandwidth occupied by uplink signals is much smaller than downlink signals, which will affect positioning accuracy limited by uplink resources and the transmission power of base stations. Therefore, using 5G NR downlink signals for positioning research based on smart terminal can utilize the advantages of large bandwidth to improve positioning accuracy, and research based on smart terminal will be widely applied in different scenarios, providing the possibility of high-precision positioning for the Internet of everything.

Moreover, due to the deployment costs and the plan of networks, existing large-scale indoor 5G networks generally rely on the deployment of a single base station, which is difficult to form geometric positioning. In this context, the present invention utilizes the multi-beam characteristics of 5G downlink signals to construct a multi-beam fingerprint and achieve high-precision indoor positioning. The present invention contributes to providing a new technical method and a possibility for seamless indoor and outdoor positioning research.

Figure 1A:
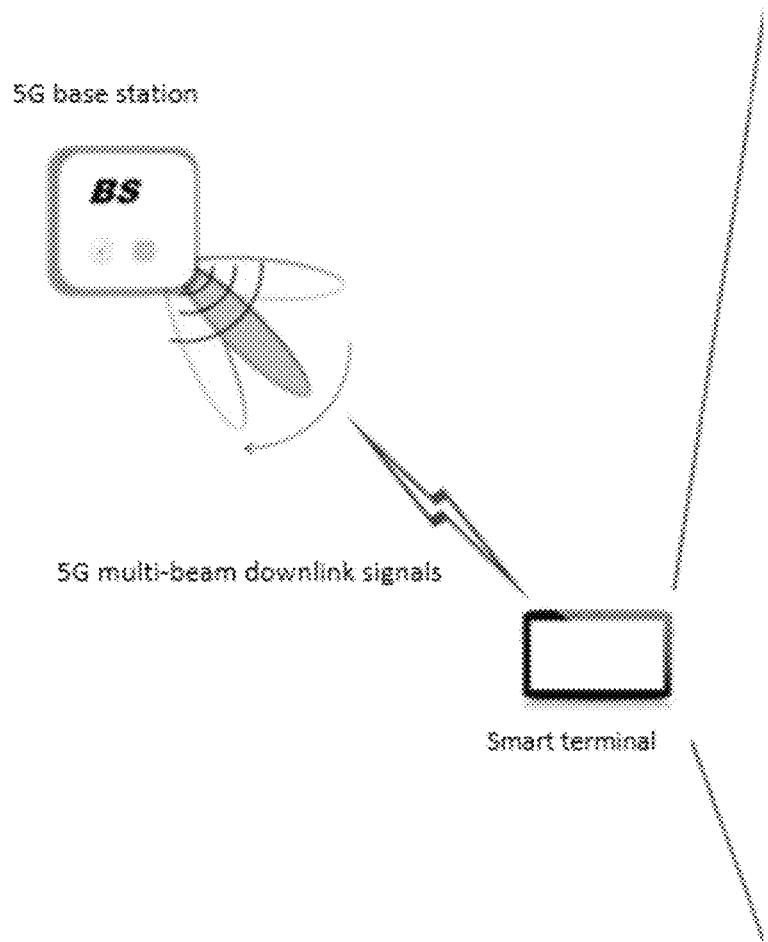
FIG. 1A and FIG. 1B are flow charts which are a method for fingerprint positioning based on 5G multi-beam downlink signals provided by an embodiment of the present invention.
Figure 1B:
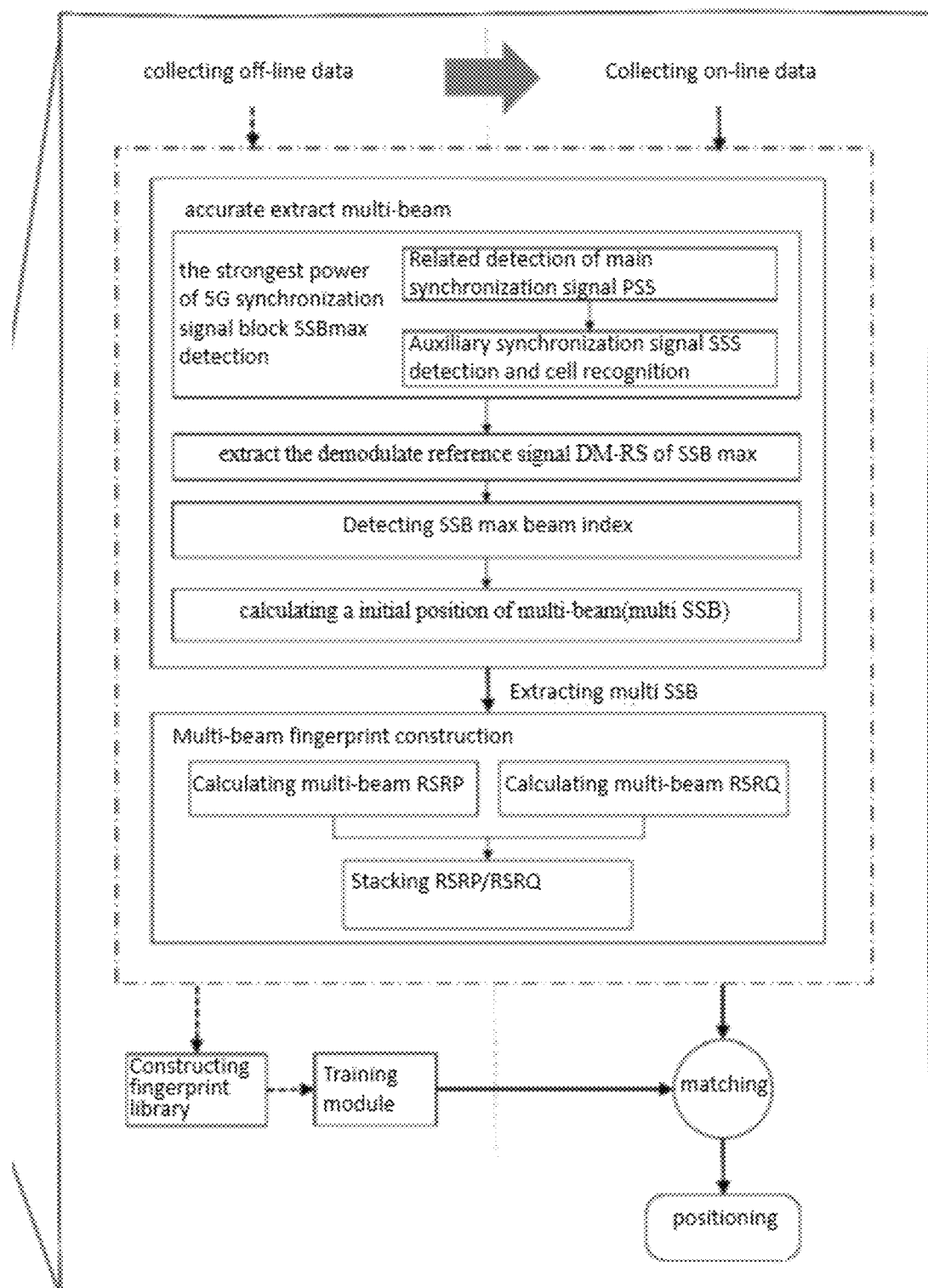

FIG. 1A and FIG. 1B are flow charts which are a method for fingerprint positioning based on 5G multi-beam downlink signals. The following provides a detailed explanation of the method of the present invention from several aspects, including precise extraction of multi-beam fingerprints, construction of multi-beam fingerprints, and localization of multi-beam fingerprints.

Step 1: accurate extraction of multi-beam, which further includes:

Step 1.1, the strongest power of 5G synchronization signal block $SSB_{max}$ detection and signal synchronization, which further includes:

(1) Related Detection of Primary Synchronization Signal (PSS)

Correlate the collected 5G downlink synchronization signals with the three PSS reference signals specified in the 3GPP protocol generated based on the m-sequence, and detect the sequence of the most relevant reference signal, denoted as $NID2 \in \{0,1,2\}$ which is the result of PSS detection. At the same time, extract the reference signal of PSS, and the starting position of the PSS signal can also be obtained by correlation, which is the starting position of the strongest power of 5G synchronization signal block $SSB_{max}$, denoted as $\epsilon_{max}$. Based on the starting position to complete detection and extraction of the strongest power synchronization signal block $SSB_{max}$.

(2) SSS Detection and Cell Recognition

In the extracted $SSB_{max}$, according to the signal format to extract the SSS signal based on the PSS signal. Performing correlation calculation between the extracted SSS signal and 336 types of SSS reference signals specified in the 3GPP TS 38.211 protocol, and detect the sequence of the most relevant reference signals, denoted as $NID1 \in \{0, 1, 2, \ldots, 335\}$, and extract the corresponding most relevant SSS reference signal;

Based on the detected NID2 and NID1, according to the following formula:

$$N_{ID}^{cell} = 3 \times NID1 + NID2$$

The identification ID of base cell can be calculated, denoted as $N_{ID}^{cell}$, to complete signal synchronization.

Step 1.2, extract the demodulate reference signal DM-RS of the strongest power synchronization signal block $SSB_{max}$.

In the extracted $SSB_{max}$, according to signal format to detect the symbol position in the time domain where DM-RS is located, then determine the specific subcarrier position of DM0RS in the frequency domain according to the base cell identification $N_{ID}^{cell}$ which is obtained by signal frame synchronization in Step 1. In combination with the position of time domain and frequency domain, to achieve a complete extract of DM-RS in SSB, the extracted DM-RS signal is denoted as $d_{bn_{max}}$.

Step 1.3, detecting the strongest power synchronization signal block $SSB_{max}$, beam index:

According to the protocol of multi-beam signal to determine the number of multi-beam, denoted as $L_{max}$. The corresponding beam index of the strongest power synchronization signal block $SSB_{max}$, is denoted as $bn \in \{0, 1, \ldots, L_{max}\}$. Due to different SSB indexes corresponding with different reference signals of DM-RS, therefore, according to the protocol and based on $N_{ID}^{cell}$ to generate all possible DM-RS reference signals $c_{bn}$, which is calculated by the following:

$$R_{dmrs}(bn) = \Sigma \| c_{bn} \cdot d^*_{bn_{max}} \|$$

Then take the index corresponding to the maximum value of the above formula, which is the $SSB_{max}$ beam index, as shown in the following:

$$bn_{max} = \underset{bn}{\mathrm{argmax}} R_{dmrs}(bn)$$

Figure 2:
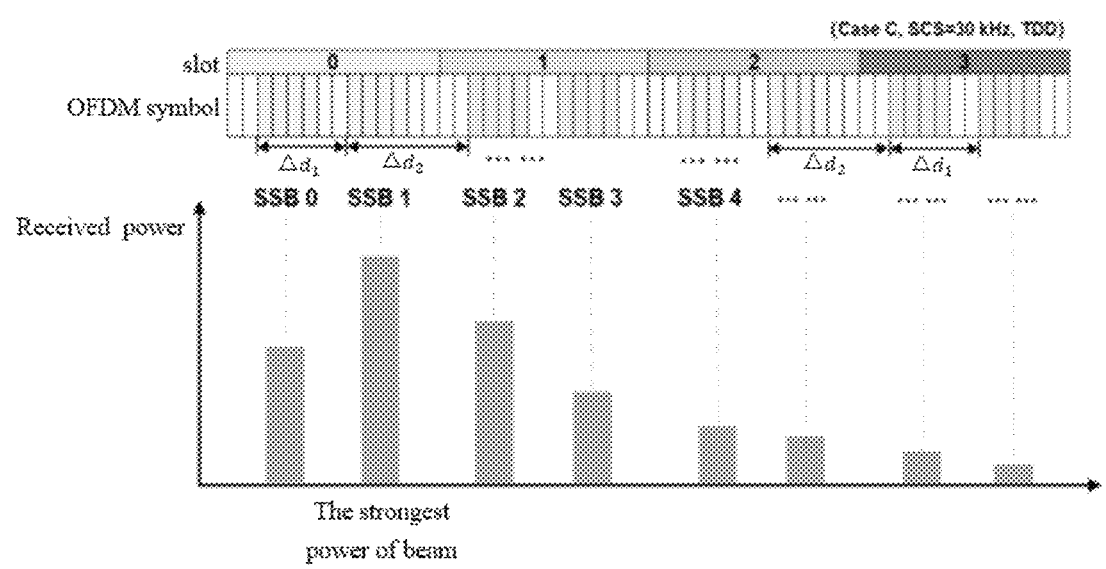
FIG. 2 is a schematic diagram of the relative position in a signal cycle with multi SSB provided by an embodiment of the present invention.

Step 1.4, calculating an initial position of multi-beam (multi SSB), which further includes:

(1) Calculating the Initial Starting Position of Multi-Beam:

According to the protocol of multi-beam signal, the relative position relationship of multiple SSB within a signal cycle can be obtained. as shown in FIG. 2. The relationship can be denoted as $a=[\Delta d_1, \Delta d_2, \Delta d_1, \ldots]$. Based on $SSB_{max}$ beam index $bn_{max}$ and initial position $\epsilon_{max}$, the initial starting position $\hat{\epsilon}_{bn}$ of each SSB can be calculated by the following formula:

$$\hat{\epsilon}_{bn} = \begin{cases} \epsilon_{max} - \sum_{i=bn}^{bn_{max}-1} a(i), & bn < bn_{max} \\ \epsilon_{max} + \sum_{i=bn_{max}}^{bn-1} a(i), & bn > bn_{max} \end{cases}$$

(2) Calculating the Precise Initial Position of Multi-Beam:

In order to further obtain accurate multi-beam starting positions and quickly eliminate sampling point deviations in the initial starting positions $\hat{\epsilon}_{bn}$. Adopting a dual discrimination mechanism based on cell identification ID and SSB index, setting an appropriate adjusting parameter $z \in (-\delta, \delta)$ of sample point, and adjusting the initial position of each beam, as shown in the following:

$$\hat{\epsilon}_{bn,z} = \hat{\epsilon}_{bn} + z$$

Based on the adjusted $\hat{\epsilon}_{bn,z}$ extract the corresponding SSB signal, and calculate the cell identification ID $\hat{N}_{ID}^z$, when $\hat{N}_{ID}^z = N_{ID}^{cell}$, performing the next step of discrimination;

Based on the method of Step 1.3, calculate the current SSB corresponding with beam index $\hat{b}$ when $\hat{b}=bn$ and $\hat{\epsilon}_{bn,z}$ correspond with PSS related detection peak, then adjusting of sample point is completed. Denoted current sample point adjusting parameter $\hat{z}_{bn}$ and the accurate starting position of current beam is $\hat{\epsilon}_{bn,\hat{z}_{bn}} = \hat{z}_{bn} + \hat{z}_{bn}$;

Adjusting all beams in sequence to obtain the accurate starting position of multi-beam. Based on the starting position of multi-beam, accurate extraction of multiple beams can be achieved.

Step 2: Multi-beam fingerprint construction. The method further includes:

Step 2.1, calculating multi-beam reference signal received power RSRP. According to the extracted multi-beam SSB from Step 1, further obtains SSS signal of each beam and DM-RS signal. The following is the calculation of each beam of RSRP based on SSS and DM-RS;

Firstly, performing autocorrelation on the receiver SSS signals and DM-RS signals, and dividing them by their signal length $N_s$, $N_d$, respectively. Calculating average received power is $P_{sss}(bn)$, $P_{dmrs}(bn)$.

Then, combine SSS and DM-RS to calculate RSRP:

$$RSRP(bn) = \frac{P_{sss}(bn) * N_s + P_{dmrs}(bn) * N_d}{N_s + N_d}$$

Step 2.2, calculates the multi-beam reference signal received quality RSRQ. Based on the multi-beam SSB extracted in Step 1 to perform autocorrelation and calculate RSSI(bn) of 5G downlink synchronization channel. According to RSRP and RSSI to calculate RSRQ is:

$$RSRQ(bn) = N_{RB} \frac{RSRP(bn)}{RSSI(bn)}$$

Wherein, $N_{RB}$ represents the number of resource blocks occupied by the multi-beam SSB in the frequency domain.

Step 2.3 stack fingerprint construction. Due to RSRP reflecting the reference signal received power of different beams, RSRQ reflects the signal-to-noise ratio and signal quality of different beams. Therefore, multi-beam RSRP and multi-beam RSRQ are stacked to form multi-beam fingerprint features, as shown in the following:

$$C=[RSRP(1), \ldots, RSRP(bn), RSRP(L_{max}),$$
$$RSRQ(1), \ldots, RSRQ(bn), RSRQ(L_{max})]$$

Compared with single fingerprint positioning method based on RSRP, the multi-beam fingerprint constructed by the present invention can provide more relevant features of space and improve the accuracy of positioning.

Step 3: Multi-beam fingerprint positioning.

The multi-beam fingerprint feature library constructed by the present invention can be used for offline fingerprint library construction and training model based on different machine learning and deep learning methods. Then perform online collecting signal data of the position which is ready to be located, and according to Steps 1-2 to obtain the multi-beam features of the position which is ready to be located. Input them into the trained model to achieve positioning by calculation. It mainly includes three steps: fingerprint database construction, model training, and online positioning. Taking the deep convolutional neural networks method as an example, further explanations are as follows:

(1) Fingerprint library construction: According to Steps 1-2 to obtain multi-beam fingerprint feature C with different reference points by using the multi-beam fingerprint construction method, and combine the position labels of the reference points to construct multi-beam fingerprint feature library.

(2) Model training: Input multi-beam fingerprint feature library which contains fingerprint features and position labels into a deep convolutional neural network, calculate the error between the position label and the output data of networks based on the loss function, and use the error as input. Adjust the weight value of the network neural and the threshold value by a backpropagation algorithm, to minimize the error of each backpropagation unit. Continuously iterate and adjust until the output of the outputting layer matches the expected result to end the network training.

(3) Online positioning: Collect 5G downlink signals of unknown points by smart terminal devices, extract multi-beam fingerprint features according to Steps 1-2, and input them as feature values into the trained neural networks in Step 3 (2) to output the results of positioning.

The present invention further provides a fingerprint positioning system based on 5G multi-beam downlink signals, including: SSB extraction module, reference signal received power RSRP calculation module, reference signal received quality of RSRQ calculation module, multi-beam fingerprint characteristics construction module and positioning module.

SSB extraction module is configured to extract multi-beam SSB from 5G downlink signals, and to obtain multi-beam SSS signal and DM-RS signal based on multi-beam SSB. Reference signal received power RSRP calculation module is configured to calculate multi-beam reference signal received power RSRP based on multi-beam SSS signal and DM-RS signal. Reference signal received quality RSRQ calculation module is configured to calculate the RSSI of 5G downlink synchronization channel based on multi-beam SSB autocorrelation, and to calculate the RSRQ based on multi-beam RSRP and RSSI. Multi-beam fingerprint characteristics construction module is configured to stack the multi-beam RSRP and RSRQ to form multi-beam fingerprint features. Positioning module is configured to input multi-beam fingerprint characteristics into neural networks, and the neural networks output positioning results.

For more detailed implementation methods for each module of the fingerprint positioning system based on 5G multi-beam downlink signals, please refer to Steps 1-3 of the above mentioned.

In some embodiments, the present invention further provides an electronic device (mobile terminal), the electronic device can be smartphone, vehicle-mounted terminal, laptop, iPad, FPGA, etc. The electronic device includes a processor and memory. The memory is configured to store non-temporary instructions (such as one or more procedure modules). The processor is configured to execute the non-temporary instructions, which can implement one or more steps of the above fingerprint positioning method based on 5G multi-beam downlink signals when executed by the processor. The memory and the processor can be interconnected through bus systems and/or other forms of connection mechanisms.

For example, the processor can be a central processing unit (CPU), graphics processing unit (GPU), or other forms of processing unit with the capability of data processing and/or program execution. For example, the central processing unit (CPU) can be an X86 or ARM architecture. The processor can be a general-purpose or specialized processor, which can control other components in electronic devices to perform the desired functions.

For example, the memory can be volatile memory and/or non-volatile memory. The volatile memory may include, for example, random access memory (RAM) and/or cache memory, etc. The non-volatile memory may include, for example, read-only memory (ROM), hard disk, erasable programmable read-only memory (EPROM), compact disc read-only memory (CD-ROM), USB memory, flash memory, etc. One or more program modules can be stored in memory, and one or more program modules can be executed in the processor to achieve various functions of electronic devices.

In some embodiments, it also provides storage medium, which is configured to store non-temporary instructions. When the non-temporary instructions are executed by an electronic device, one or more steps of the fingerprint positioning method based on 5G multi-beam downlink signals can be achieved. The fingerprint positioning method based on 5G multi-beam downlink signals provided in embodiments of the present invention can be stored in a storage medium when implemented in software that can be sold or used as an independent product. For relevant instructions of storage media, please refer to the corresponding description of electronic devices' memory in the previous embodiments, which is not elaborated on here.

What is claimed is:

1. A fingerprint positioning method based on 5G multi-beam downlink signals, characterized by, include:
   a method of extracting multi-beam synchronization signal block (SSB) from 5G downlink signals is as follows:
   performing primary synchronization signal (PSS) related detection and synchronization signal (SSS) related detection on the collected 5G downlink synchronization signals, extract the PSS signal, SSS signal and a strongest power synchronization signal block $SSB_{max}$, and calculate an identification code $N_{ID}^{cell}$ of a base station cell, complete signal synchronization;
   in the extracted synchronization signal block $SSB_{max}$ with the strongest power, a symbol position of a demodulation reference signal (DM-RS) in a time domain is detected according to the signal format, and then the subcarrier position of the DM-RS is determined based on the base station cell identification code $N_{ID}^{cell}$; combining with the position in the time domain and frequency domain to achieve complete extraction of DM-RS, the extracted DM-RS signal is recorded as $d_{bn_{max}}$;
   according to the multi-beam signal protocol, the number of multi-beams $L_{max}$ is determined, and a beam index corresponding to the synchronization signal block $SSB_{max}$ with the strongest power is recorded as $bn \in \{0, 1, \ldots, L_{max}\}$, and then based on the base station cell identification code $N_{ID}^{cell}$, generate all possible DM-RS reference signals $c_{bn}$; taking the index $bn_{max}$ corresponding to a maximum value of a formula $R_{dmrs}(bn)=\Sigma\|c_{bn}\cdot d_{bn_{max}}*\|$ as the beam index of the strongest synchronization signal block $SSB_{max}$; according to the multi-beam signal protocol, a relative position relationship of multiple SSBs within one signal cycle is obtained, based on the strongest power synchronization signal block $SSB_{max}$ beam index $bn_{max}$ and starting position $\hat{\epsilon}_{max}$ calculates an initial starting position of each SSB $\hat{\epsilon}_{bn}$;
   a dual discrimination mechanism based on a cell identification code and SSB index is used to set a sampling point adjustment parameter $z \in (-\delta, \delta)$ to adjust the starting position of each beam, the adjustment formula is $\hat{\epsilon}_{bn,z}=\hat{\epsilon}_{bn}+z$;
   re-extracting a corresponding SSB based on an adjusted $\hat{\epsilon}_{bn,z}$, and the cell identification code is calculated as $\hat{N}_{ID}^z$; when $\overline{N}_{ID}^z=N_{ID}^{cell}$, calculate the beam index corresponding to a current SSB as $\hat{b}$; when $\hat{b}=bn$, and $\hat{\epsilon}_{bn,z}$ corresponds to the PSS related detection peak, then the sampling point adjustment is completed, and the current sampling point adjustment parameter is recorded as $\hat{z}_{bn}$, then an accurate starting point of the current beam is $\hat{\epsilon}_{bn,\hat{z}_{bn}}=\hat{\epsilon}_{bn}+\hat{z}_{bn}$;
   adjusting all beams to obtain a precise starting position of the multi-beam, and based on the precise starting position of the multi-beam, complete the precise extraction of the multi-beam;
   calculating multi-beam reference signal received power (RSRP) based on multi-beam SSS signal and DM-RS signal;
   calculating a received signal strength syndicator (RSSI) of 5G downlink synchronization channel based on multi-beam SSB autocorrelation, and calculating a multi-beam reference signal received quality (RSRQ) based on multi-beam RSRP and RSSI;
   stacking the multi-beam RSRP and RSRQ to form multi-beam fingerprint features;
   inputting multi-beam fingerprint characteristics into neural networks, and the neural networks output positioning results.

2. The fingerprint positioning method based on 5G multi-beam downlink signals according to claim 1, characterized by, performing autocorrelation on the received SSS signals and DM-RS signals, and dividing them by their signal length $N_s$, $N_d$ respectively, calculating average received powers are $P_{sss}(bn)$, $P_{dmrs}(bn)$, the formula of the received power RSRQ of multi-beam reference signal is:

$$RSRP(bn) = \frac{P_{sss}(bn)*N_s + P_{dmrs}(bn)*N_d}{N_s + N_d}$$

wherein, $bn \in \{0, 1, \ldots, L_{max}\}$, $L_{max}$ is denoted as the number of multi-beam.

3. The fingerprint positioning method based on 5G multi-beam downlink signals according to claim 2, characterized by, the formula of the received quality RSRQ of multi-beam reference signal is:

$$RSRQ(bn) = N_{RB}\frac{RSRP(bn)}{RSSI(bn)}$$

wherein, $N_{RB}$ represents the number of resource blocks occupied by the multi-beam SSB in the frequency domain.

4. The fingerprint positioning method based on 5G multi-beam downlink signals according to claim 3, characterized by, multi-beam fingerprint features are:

$C=[RSRP(1), \ldots ,RSRP(bn),RSRP(L_{max}),$
$\quad RSRQ(1), \ldots ,RSRQ(bn),RSRQ(L_{max})]$.

5. A fingerprint positioning system based on 5G multi-beam downlink signals, characterized by, include:
   SSB extraction module, which is configured to extract multi-beam synchronization signal block (SSB) from 5G downlink signals, and to obtain multi-beam synchronization signal (SSS) signal and demodulation reference signal (DM-RS) signal based on multi-beam SSB; the processing is as follows:
   a method of extracting multi-beam SSB from 5G downlink signals is as follows:
   performing primary synchronization signal (PSS) related detection and SSS related detection on the collected 5G downlink synchronization signals, extract the PSS signal, SSS signal and a strongest power synchronization signal block $SSB_{max}$, and calculate an identification code $N_{ID}^{cell}$ of a base station cell, complete signal synchronization;
   in the extracted synchronization signal block $SSB_{max}$ with the strongest power, the symbol position of the DM-RS in a time domain is detected according to the signal format, and then the subcarrier position of the DM-RS is determined based on the base station cell identification code $N_{ID}^{cell}$; combining with the position in the time domain and frequency domain to achieve complete extraction of DM-RS, the extracted DM-RS signal is recorded as $d_{bn_{max}}$;
   according to the multi-beam signal protocol, the number of multi-beams $L_{max}$ is determined, and a beam index corresponding to the synchronization signal block $SSB_{max}$ with the strongest power is recorded as $bn \in \{0, 1, \ldots, L_{max}\}$, and then based on the base station cell identification code $N_{ID}^{cell}$, generate all possible DM-RS reference signals Con; taking the index $bn_{max}$ corresponding to a maximum value of a formula $R_{dmrs}(bn) = \Sigma \|c_{bn} \cdot d_{bn_{max}}*\|$ as the beam index of the strongest synchronization signal block $SSB_{max}$; according to the multi-beam signal protocol, a relative position relationship of multiple SSBs within one signal cycle is obtained, based on the strongest power synchronization signal block $SSB_{max}$ beam index $bn_{max}$ and starting position $\hat{\epsilon}_{max}$ calculates an initial starting position of each SSB $\hat{\epsilon}_{bn}$;
   a dual discrimination mechanism based on a cell identification code and SSB index is used to set a sampling point adjustment parameter $z \in (-\delta, \delta)$ to adjust the starting position of each beam, the adjustment formula is $\hat{\epsilon}_{bn,z} = \hat{\epsilon}_{bn} + Z$;
   re-extracting a corresponding SSB based on an adjusted $\hat{\epsilon}_{bn,z}$, and the cell identification code is calculated as $\hat{N}_{ID}^z$; when $\hat{N}_{ID}^z = N_{ID}^{cell}$, calculate the beam index corresponding to a current SSB as $\hat{b}$; when $\hat{b}=bn$, and $\hat{\epsilon}_{bn,z}$ corresponds to the PSS related detection peak, then the sampling point adjustment is completed, and the current sampling point adjustment parameter is recorded as $\hat{z}_{bn}$, then an accurate starting point of the current beam is $\hat{\epsilon}_{bn,\hat{z}_{bn}} = \hat{\epsilon}_{bn} + \hat{z}_{bn}$;
   adjusting all beams to obtain a precise starting position of the multi-beam, and based on the precise starting position of the multi-beam, complete the precise extraction of the multi-beam;
   reference signal received power (RSRP) calculation module, which is configured to calculate multi-beam reference signal received power RSRP based on multi-beam SSS signal and DM-RS signal;
   reference signal received quality (RSRQ) calculation module, which is configured to calculate the RSSI of 5G downlink synchronization channel based on multi-beam SSB autocorrelation, and to calculate the received quality RSRQ of multi-beam reference signal based on multi-beam reference signal received power RSRP and received signal strength syndicator (RSSI);
   multi-beam fingerprint characteristics construction module, which is configured to stack the multi-beam reference signal received power RSRP and received quality RSRQ of multi-beam reference signal to form multi-beam fingerprint features; and
   positioning module, which is configured to input multi-beam fingerprint characteristic into neural networks, and the neural networks output positioning results.

6. The fingerprint positioning system based on 5G multi-beam downlink signals according to claim 5, characterized by, performing autocorrelation on the received SSS signals and DM-RS signals, and dividing them by their signal length $N_s$, $N_d$, calculating average received powers are $P_{sss}(bn)$, $P_{dmrs}(bn)$, the formula of the received power RSRQ of multi-beam reference signal is:

$$RSRP(bn) = \frac{P_{sss}(bn) * N_s + P_{dmrs}(bn) * N_d}{N_s + N_d}$$

wherein, $bn \in \{0, 1, \ldots, L_{max}\}$, $L_{max}$ is denoted as the number of multi-beam.

7. The fingerprint positioning system based on 5G multi-beam downlink signals according to claim 6, characterized by, the formula of the received quality RSRQ of multi-beam reference signal is:

$$RSRP(bn) = N_{RB} \frac{RSRP(bn)}{RSSI(bn)}$$

wherein, $N_{RB}$ represents the number of resource blocks occupied by the multi-beam SSB in the frequency domain.

8. The fingerprint positioning system based on 5G multi-beam downlink signals according to claim 7, characterized by, multi-beam fingerprint features are:

$C=[RSRP(1), \ldots, RSRP(bn), RSRP(Lmax), RSRQ(1), \ldots, RSRQ(bn), RSRQ(L_{max})]$.

9. An electronic device, characterized by, includes:
   processor;
   memory, which includes one or more procedure modules;
   wherein, one or more procedure modules can be stored in the memory and is configured to executed by the processor, the one or more procedure modules include instructions of fingerprint positioning method based on a 5G multi-beam downlink signal according to claim 1.

* * * * *